US011421063B2

(12) United States Patent
Adkins

(10) Patent No.: US 11,421,063 B2
(45) Date of Patent: Aug. 23, 2022

(54) PREFORMED STABILIZERS WITH IMPROVED STABILITY

(71) Applicant: COVESTRO LLC, Pittsburgh, PA (US)

(72) Inventor: Rick L. Adkins, Canonsburg, PA (US)

(73) Assignee: Covestro LLC, Pittsburgh, PA (US)

( * ) Notice: Subject to any disclaimer, the term of this patent is extended or adjusted under 35 U.S.C. 154(b) by 342 days.

(21) Appl. No.: 16/597,944

(22) Filed: Oct. 10, 2019

(65) Prior Publication Data
US 2021/0108015 A1    Apr. 15, 2021

(51) Int. Cl.
C08F 2/38       (2006.01)
C08F 255/00     (2006.01)
C08F 283/06     (2006.01)
C08F 285/00     (2006.01)
C08F 290/14     (2006.01)
C08G 18/48      (2006.01)
C08G 18/63      (2006.01)
C08G 18/81      (2006.01)
C08K 5/14       (2006.01)

(52) U.S. Cl.
CPC .............. C08F 255/00 (2013.01); C08F 2/38 (2013.01); C08G 18/4866 (2013.01); C08G 18/632 (2013.01); C08G 18/635 (2013.01); C08G 18/8116 (2013.01); C08K 5/14 (2013.01); C08G 2110/0008 (2021.01)

(58) Field of Classification Search
CPC ................................ C08F 2/28; C08G 18/635
See application file for complete search history.

(56) References Cited

U.S. PATENT DOCUMENTS

| | | |
|---|---|---|
| 3,073,788 A | 1/1963 | Barnes et al. |
| 3,953,393 A | 4/1976 | Ramlow et al. |
| 4,119,586 A * | 10/1978 | Shah .................... C08F 291/08 521/137 |
| 4,148,840 A | 4/1979 | Shah |
| 4,208,314 A * | 6/1980 | Priest .................... C08F 220/44 524/710 |
| 4,242,249 A | 12/1980 | Van Cleve et al. |
| 4,327,005 A | 4/1982 | Ramlow et al. |
| 4,334,049 A | 6/1982 | Ramlow et al. |
| 4,454,255 A | 6/1984 | Ramlow et al. |
| 4,458,038 A | 7/1984 | Ramlow et al. |
| 4,460,715 A | 7/1984 | Hoffman et al. |
| 4,463,107 A | 7/1984 | Simroth et al. |
| 4,550,194 A | 10/1985 | Reichel et al. |
| 4,652,589 A | 3/1987 | Simroth et al. |
| 4,745,153 A | 5/1988 | Hoffman |
| 4,954,561 A | 9/1990 | Gerkin et al. |
| 4,997,857 A | 3/1991 | Timberlake et al. |
| 5,093,412 A * | 3/1992 | Mente ................... C08F 299/06 524/762 |
| 5,196,476 A | 3/1993 | Simroth |
| 5,268,418 A | 12/1993 | Simroth |
| 5,324,774 A | 6/1994 | Nishikawa et al. |
| 5,494,957 A | 2/1996 | Moore et al. |
| 5,554,662 A | 9/1996 | Sanders et al. |
| 5,594,066 A | 1/1997 | Heinemann et al. |
| 5,814,699 A | 9/1998 | Kratz et al. |
| 5,854,358 A | 12/1998 | Heinemann et al. |
| 5,854,386 A * | 12/1998 | Shen .................. C08G 65/2609 528/403 |
| 5,990,185 A | 11/1999 | Fogg |
| 5,990,232 A | 11/1999 | Shen et al. |
| 6,013,731 A | 1/2000 | Holeschovsky et al. |
| 6,172,164 B1 | 1/2001 | Davis et al. |
| 6,455,603 B1 | 9/2002 | Fogg |
| 6,624,209 B2 | 9/2003 | Kawamoto et al. |
| 7,148,288 B2 | 12/2006 | Borst et al. |
| 7,160,975 B2 | 1/2007 | Adkins et al. |
| 7,179,882 B2 * | 2/2007 | Adkins .............. C08G 18/4883 528/272 |
| 7,759,423 B2 | 7/2010 | Chauk |
| 7,776,969 B2 | 8/2010 | Adkins |
| 8,383,733 B2 | 2/2013 | Adkins et al. |
| 8,835,565 B2 | 9/2014 | England et al. |
| 8,946,313 B2 | 2/2015 | Adkins et al. |
| 10,239,985 B2 | 3/2019 | Adkins et al. |
| 2004/0266958 A1 * | 12/2004 | Borst .................. C08F 290/062 525/518 |
| 2013/0345331 A1 * | 12/2013 | Suzuki ................ C08G 18/635 521/164 |
| 2014/0249274 A1 | 9/2014 | Adkins |
| 2017/0306076 A1 | 10/2017 | Adkins et al. |

FOREIGN PATENT DOCUMENTS

CN    106519148 B    4/2019

* cited by examiner

Primary Examiner — Melissa A Rioja
(74) Attorney, Agent, or Firm — Donald R. Palladino; N. Denise Brown

(57) ABSTRACT

This invention relates to novel preformed stabilizers in which a portion of the polymer control agent is recovered and comprises from 10 to 1500 ppm of an inhibitor. This invention also relates to a process for preparing these preformed stabilizers, and to polymer polyols comprising these novel preformed stabilizers macromers and to a process for preparing polymer polyols comprising these novel preformed stabilizers. The present invention also relates to polyurethane foams comprising these polymer polyols, and to processes for preparing these polyurethane foams.

20 Claims, No Drawings

PREFORMED STABILIZERS WITH IMPROVED STABILITY

FIELD

This invention relates to novel preformed stabilizers for polymer polyols, to polymer polyols comprising these novel preformed stabilizers, and to foams comprising these polymer polyols. The invention also relates to processes for the preparation of these preformed stabilizers, polymer polyols, and the foams.

BACKGROUND

Polymer polyols, also known as filled polyols, are viscous fluids comprising fine particles dispersed in polyols. Examples of solids used include styrene-acrylonitrile co-polymers and polyureas. The solids are typically prepared by in situ polymerization of ethylenically unsaturated monomers in the base polyol. Polymer polyols are commonly used for the production of polyurethane foams, and particularly flexible polyurethane foams.

Macromers are known and have been used to stabilize polymer polyols by co-polymerization with one or more ethylenically unsaturated monomers (such as, for example, styrene and acrylonitrile). Because of similarities in chemical composition, the polyether tail(s) energetically favor association with the polyol molecules in the continuous phase rather than with the styrene-acrylonitrile co-polymer. The polyether tails extend into the continuous phase, thereby forming a "brush" layer near the particle-fluid interface which screens the attractive van der Waals forces between particles. This phenomenon is known as steric stabilization. In order to form a brush layer which effectively screens van der Waals forces several conditions must be met. The polyether tails must be similar in chemical composition to the continuous phase so that they fully extend into the continuous phase and do not adsorb to the particles. Also, the surface coverage and molecular weight must be high enough so that the interfacial brush layer is sufficiently thick to prevent agglomeration of the solid particles.

It is known that large, bulky molecules are effective macromers because less material can be used to sterically stabilize the particles. Generally speaking, this is due to the fact that a highly branched polymer has a considerably larger excluded volume than a linear molecule (such as, e.g., a monol), and therefore less of the branched polymer is required. Coupling multi-functional polyols with polyisocyanates is also known and described in the field of polymer polyols as a suitable means to increase the molecular weight of the macromer.

Preformed stabilizers (PFS) are known to be useful for preparing polymer polyols having a lower viscosity at a high solids content. In general, a preformed stabilizer is an intermediate obtained by reacting a macromer which contains reactive unsaturation (e.g. acrylate, methacrylate, maleate, etc.) with a monomer (i.e. acrylonitrile, styrene, methyl methacrylate, etc.), optionally in a diluent or a solvent (i.e. methanol, isopropanol, toluene, ethylbenzene, polyether polyols, etc.) to give a co-polymer (dispersion having e.g. a low solids content (e.g. <20%), or soluble grafts, etc.). Thus, in the preformed stabilizer process, a macromer is reacted with monomers to form a co-polymer composed of macromer and monomers. These co-polymers comprising a macromer and monomers are commonly referred to as preformed stabilizers (PFS). Reaction conditions may be controlled such that a portion of the co-polymer precipitates from solution to form a solid. In many applications, a dispersion having a low solids content (e.g., 3 to 15% by weight) is obtained. Preferably, the reaction conditions are controlled such that the particle size is small, thereby enabling the particles to function as "seeds" in the polymer polyol reaction. The PFS products obtained are inherently turbid since they are stable low solids dispersions.

It has surprisingly been found that, stable polymer polyols can be produced by using preformed stabilizers in which the polymer control agent used to produce the preformed stabilizers is essentially free of turbidity. The resulting polymer polyols have lower viscosity and a smaller mean particle size compared to polymer polyols in which the polymer control agent used to form the preformed stabilizer is turbid.

SUMMARY

This invention relates to a preformed stabilizer comprising the free-radical polymerization product of:
(a) at least one ethylenically unsaturated macromer;
(b) at least one ethylenically unsaturated monomer; and
(c) at least one free-radical polymerization initiator; in the presence of
(d) a polymer control agent which comprises:
 (1) from 5 to 95% by weight of fresh polymer control agent; and
 (2) from 5 to 95% by weight of a recovered polymer control agent;
 wherein the recovered polymer control agent comprises from 10 to 1500 ppm, based on the weight of the recovered polymer control agent, of an inhibitor comprising at least one of a phenolic containing compound, an amine containing compound, a quinone containing compound, and a N-nitrosophenylhydroxyl-amine containing compound, and
 wherein the %'s by weight of (1) and (2) totaling 100% by weight of (d); and, optionally,
(e) a diluent.

The present invention also relates to a process for the preparation of the preformed stabilizer. This process comprises (I) free-radically polymerizing (a) at least one ethylenically unsaturated macromer; (b) at least one ethylenically unsaturated monomer; and (c) at least one free-radical polymerization initiator; in the presences of (d) a polymer control agent which comprises (1) from 5 to 95% by weight of fresh polymer control agent, and (2) from 5 to 95% by weight of a recovered polymer control agent, wherein the recovered polymer control agent comprises from 10 to 1500 ppm, based on the weight of the recovered polymer control agent, of an inhibitor comprising at least one of a phenolic containing compound, an amine containing compound, a quinone containing compound, and a N-nitrosophenylhydroxylamine containing compound and wherein the %'s by weight of (1) and (2) totaling 100% by weight of (d); and, optionally, (e) a liquid diluent.

This invention also relates to a polymer polyol comprising the free-radical, in-situ polymerization product of: (A) a base polyol, with (B) the novel preformed stabilizer described herein, and (C) at least one ethylenically unsaturated monomer, in the presence of (D) at least one free-radical polymerization initiator, and, optionally, (E) a chain transfer agent, and, optionally, (F) a polymer control agent.

This invention also relates to a process of preparing a polymer polyol. This process comprises free-radically polymerizing: (A) a base polyol, with (B) the novel preformed stabilizer described herein, and (C) at least one ethylenically unsaturated monomer, in the presence of (D) at least one free-radical polymerization initiator, and, optionally, (E) a chain transfer agent, and, optionally, (F) a polymer control agent.

The invention also relates to a polyurethane foam that comprises the reaction product of a di- or polyisocyanate with an isocyanate-reactive component which comprises the polymer polyols described herein, in the presence of a catalyst, a blowing agent and/or a surfactant.

The invention also relates to a process of preparing a polyurethane foam in which the process comprises reacting an isocyanate component with an isocyanate component wherein the isocyanate component comprises the polymer polyol described above, in the presence of a catalyst, a blowing agent and/or a surfactant.

DETAILED DESCRIPTION

The present invention will now be described for purposes of illustration and not limitation. Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to OH numbers, equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, as determined by GPC as described herein, unless indicated otherwise.

The number average and weight average, $M_n$ and $M_w$, respectively, molecular weights herein were determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

Isocyanate index is the relative stoichiometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation provides an isocyanate index of 100%.

The term "monomer" means the simple unpolymerized form of a chemical compound having relatively low molecular weight, e.g., acrylonitrile, styrene, methyl methacrylate, and the like.

The phrase "polymerizable ethylenically unsaturated monomer" means a monomer containing ethylenic unsaturation ($>C=C<$, i.e. two double bonded carbon atoms) that is capable of undergoing free radically induced addition polymerization reactions.

The term preformed stabilizer is defined as an intermediate obtained by reacting a macromer with one or more monomers (i.e. acrylonitrile, styrene, methyl methacrylate, etc.), with and at least one free radical initiator, in the presence of a polymer control agent (PCA) and, optionally, in a diluent, to give a co-polymer (i.e. a dispersion having e.g. a low solids content (e.g. <30%), or soluble grafts, etc.).

The term "stability" means the ability of a material to maintain a stable form such as the ability to stay in solution or in suspension. Polymer polyols having good stability generally also have good filterability.

The phrase "polymer polyol" refers to such compositions which can be produced by polymerizing one or more ethylenically unsaturated monomers dissolved or dispersed in a polyol in the presence of a free radical catalyst to form a stable dispersion of polymer particles in the polyol. These polymer polyols have the valuable property, for example, that polyurethane foams and elastomers produced therefrom exhibit higher load-bearing properties than are provided by the corresponding unmodified polyols.

As used herein, the phrase "mole unsaturation/mole polyol" is a calculated value which is determined by dividing the number of moles of unsaturated compound (e.g. TMI, maleic anhydride, etc.) used by the number of moles of polyol. The number of moles of polyols is based on the molecular weight of the polyol as determined by GPC as described herein).

As used herein, the phrase "polyol feed" refers to the amount of base polyol feed present in the polymer polyol or present in the process of preparing the polymer polyol.

As used herein, the phrase "total feed" refers to the sum of all quantities of components present in each of the various products (i.e., preformed stabilizers, polymer polyols, etc.) and/or present in the process of preparing each of the various products.

The total solids levels (i.e., weight percent of polyacrylonitrile and polystyrene) of the polymer polyols were measured by an analytical technique known as near-infrared (NIR) spectroscopy. The specific NIR measurement of total solids is a variation on ASTM D6342-12, "Polyurethane Raw Materials: Determining Hydroxyl Number of Polyols by Near Infrared (NIR) Spectroscopy". The variations used include (1) substitution of the absorption bands associated with polyacrylonitrile and polystyrene instead of those associated with hydroxyl number, and (2) acquiring the NIR spectra in reflection mode rather than transmission mode. The use of reflection mode is due to polymer polyols being opaque, and thus are scattering materials with respect to infrared radiation. Measurement of the NIR spectra in reflection mode results in higher quality spectra for calibration and measurement purposes as PMPOs reflect more NIR radiation than they transmit. Calibrations to be used as standards were developed in accordance with ASTM D6342-12. In addition, the absorption bands associated with polyacrylonitrile and polystyrene are used to calculate the weight ratio of styrene:acrylonitrile in the total polymer. One skilled in the art will recognize that this is an analytical confirmation of the main mechanism for controlling the S/AN ratio, which is the wt. % of monomers in the total reactor feed.

Hydroxyl numbers or OH numbers were determined according to ASTM D4274-11, and are reported in mg [KOH]/g [polyol].

As used herein "viscosity" is in millipascal-seconds (mPa·s) measured at 25° C. The viscosity was measured on an Anton Paar S VM3000 viscometer at 25° C. that has been demonstrated to give equivalent results as can be generated with ASTM-D4878-15. The instrument was calibrated using mineral oil reference standards of known viscosity.

As used herein, "turbid/turbidity" refers to visible solids/particulates in a liquid as detected with visual observation.

The preformed stabilizers herein comprise the free-radical polymerization product of: (a) at least one ethylenically unsaturated macromer, with (b) at least one ethylenically unsaturated monomer, in the presence of (c) at least one free-radical polymerization initiator, preferably a peroxide initiator, (d) a polymer control agent, and, optionally, (e) a liquid diluent, wherein (d) the polymer control agent comprises (1) from 5 to 95% by weight of fresh polymer control agent and (2) from 5 to 95% by weight of a recovered polymer control agent. In addition, the recovered polymer control agent comprises from 10 to 1500 ppm, based on 100% by weight of the recovered polymer control agent, of an inhibitor comprising at least one of a phenolic containing compound, an amine containing compound, a quinone containing compound and a N-nitrosophenylhydroxylamine containing compound.

Suitable ethylenically unsaturated macromers (a) include, for example, macromers that comprise the reaction product of: (i) a starter compound having a functionality of 2 to 8, and a hydroxyl number of 20 to 50; (ii) from 0.1 to 3% by weight, based on 100% by weight of the sum of components (i), (ii) and (iii), of a hydroxyl-reactive compound that contains reactive unsaturation; and (iii) from 0 to 30% by weight, based on 100% by weight of the sum of components (i), (ii) and (iii), of a diisocyanate.

As described in, for example, U.S. Pat. No. 5,196,476, the disclosure of which is herein incorporated by reference, suitable preformed stabilizers can be prepared by reacting a combination of components (a), (b), (c) and (d), and optionally, (e), as described above, in a reaction zone maintained at a temperature sufficient to initiate a free radical reaction, and under sufficient pressure to maintain only liquid phases in the reaction zone, for a sufficient period of time to react (a), (b) and (c); and to obtain the preformed stabilizer. Preformed stabilizers are inherently turbid, since they are low solids dispersions.

Suitable starter compounds to be used as (i) in the macromer containing reactive unsaturation, include compounds having a hydroxyl functionality of from 2 to 8, or of from 3 to 6; and have a hydroxyl number of from 20 to 50 or of from 25 to 40. Examples of such starter compounds include alkylene oxide adducts of hydroxyl functional compounds such as ethylene glycol, propylene glycol, diethylene glycol, dipropylene glycol, tripropylene glycol, glycerin, trimethylolpropane, pentaerythritol, sorbitol, ethylenediamine, toluene diamine, etc. These alkylene oxide adducts may comprise propylene oxide, ethylene oxide, butylene oxide, styrene oxide, and mixtures thereof. It is possible for these starter compounds comprise 100% of an alkylene oxide such as, for example, propylene oxide, or a mixture of propylene oxide and a second alkylene oxide such as ethylene oxide or butylene oxide. When a mixture of alkylene oxides are used to form the starter compounds (i), mixtures of propylene oxide and ethylene oxide may be advantageous. Such mixtures may be added simultaneously (i.e. two or more alkylene oxide are added as co-feeds), or sequentially (one alkylene oxide is added first, and then another alkylene oxide is added). It is possibly to use a combination of simultaneous and sequential addition of alkylene oxides. In one embodiment, an alkylene oxide such as propylene oxide may be added first, and then a second alkylene oxide such as ethylene oxide added as a cap.

Other examples of such compounds for starter (i) in the macromer include polyoxyethylene glycols, triols, tetrols and higher functionality polyols, and mixtures thereof, etc. When mixtures are used, the ethylene oxide and propylene oxide may be added simultaneously or sequentially to provide internal blocks, terminal blocks or random distribution of the oxyethylene groups and/or oxypropylene groups in the polyether polyol.

By alkoxylation of the starter, a suitable compound for the starter of the macromer can be formed. The alkoxylation reaction may be catalyzed using any conventional catalyst including, for example, potassium hydroxide (KOH) or a double metal cyanide (DMC) catalyst.

Other suitable polyols for the starter (i) of the macromer in the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4-1,6- and 1,8-dihydroxyoctane, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes, etc.

Suitable compounds to be used as component (a)(ii) the hydroxyl-reactive compound that contains reactive unsaturation include, for example, methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, adducts of toluenediisocyanate and 2-hydroxypropyl acrylate, etc.

The macromer (a) may additionally comprise (iii) 0 to 3% by weight, or from 0.05 to 2.5% by weight, or 0.1 to 1.5% by weight, based on 100% by weight of the sum of components (i), (ii) and (iii), of a diisocyanate component. Suitable diisocyanates include various isomers of diphenylmethane diisocyanate and isomeric mixtures of diphenylmethane diisocyanate such as, for example a mixture of 2,4'-diphenylmethane diisocyanate, 4,4'-diphenylmethane diisocyanate and/or 2,2'-diphenyl-methane diisocyanate. In one embodiment, a mixture of 2,4'-diphenylmethane diisocyanate and of 4,4'-diphenylmethane diisocyanate is suitable. Other suitable isocyanates include toluenediisocyanate, isophoronediisocyanate, hexamethylenediisocyanate, 4,4'-methylenebis(cyclohexyl isocyanate), etc.

Suitable (b) ethylenically unsaturated monomers for the preformed stabilizers of the invention include, for example, aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the preformed stabilizer. Of the above monomers, the monovinylidene aromatic monomers, particularly styrene, and the ethylenically unsaturated nitriles, particularly acrylonitrile, are preferred.

When using a mixture of ethylenically unsaturated monomers, it is preferred to use a mixture of two monomers. These monomers are typically used in weight ratios of from 80:20 (styrene:acrylonitrile) to 20:80 (S:AN), or preferably from 75:25 (S:AN) to 25:75 (S:AN).

Suitable free-radical polymerization initiators (c) for preformed stabilizer are those catalysts having a satisfactory half-life within the temperature ranges used in forming the stabilizer, i.e. the half-life should be about 25% or less of the residence time in the reactor at any given time. Preferred initiators for this portion of the invention include acyl peroxides such as didecanoyl peroxide and dilauroyl peroxide, alkyl peroxides such as di-tert-butyl peroxide and dicumyl peroxide, peroxyketals such as 1,1-di(t-butylperoxy)cyclohexane, 1,1-di(t-amylperoxy)cyclohexane, peroxyesters such as t-butyl peroxy-2-ethylhexanoate (TBPEH), t-butylperpivalate, t-amyl peroctoate, t-amylperoxypivalate, 2,5-dimethyl-hexane-2,5-di-per-2-ethyl hexoate, t-butyl perneodecanoate, t-butylperbenzoate and 1,1-dimethyl-3-hydroxybutyl peroxy-2-ethylhexanoate, and azo catalysts such as azobis(isobutyronitrile), 2,2'-azo bis-(2-methoxylbutyronitrile), and mixtures thereof. Most preferred are the peroxyketals and peroxyesters described above, and azo catalysts.

Suitable free-radical initiators are present in concentrations ranging from about 0.01 to about 2% by weight, or from about 0.05 to 1% by weight, or preferably from about 0.05 to 0.5% by weight, or between any combination of the preceding upper and lower limits, inclusive, based on the total weight of the components (i.e. 100% by weight of the combined weight of the macromer, the ethylenically unsaturated monomer, the free-radical polymerization initiator and, optionally the liquid diluent and/or the chain transfer agent).

The preformed stabilizers also comprise a polymer control agent (d). Suitable polymer control agents for this aspect of the present invention include, for example, isopropanol, ethanol, tert-butanol, toluene, ethylbenzene, triethylamine, dodecylmercaptan, octadecylmercaptan, carbon tetrachloride, carbon tetrabromide, chloroform, methylene chloride. Polymer control agents are also commonly referred to as molecular weight regulators. These compounds are employed in conventional amounts to control the molecular weight of the copolymerizate. Isopropanol is a preferred polymer control agent.

The polymer control agent comprises (1) from 5 to 95% by weight, preferably from 10 to 90%, and more preferably from 15 to 85% by weight of fresh polymer control agent, and (2) from 5 to 95% by weight, preferably from 10 to 90%, and more preferably from 15 to 85% by weight of a recovered polymer control agent, with the sum of (1) and (2) totaling 100% by weight of the polymer control agent present in the preformed stabilizer.

The total amount of polymer control agent (PCA) present in the preformed stabilizers ranges from 30% to about 80% by weight, based on the total weight of the preformed stabilizer. The total amount of polymer control agent is comprised of: (1) fresh polymer control agent which is typically added separately to the preformed stabilizer process, and (2) recovered polymer control agent which is obtained from the purification of the crude polymer polyol and used without further purification to produce preformed stabilizer. More specifically, the total amount of polymer control agent comprises (1) from 5 to about 95% by weight of fresh polymer control agent that is typically added separately to the preformed stabilizer, and (2) from about 5% to about 95% by weight of recovered polymer control agent in the preformed stabilizer. In addition, the sum of the % by weight of fresh polymer control agent (1) and the % by weight of recovered polymer control agent (2) totals 100% by weight of the total amount of polymer control agent. Although the fresh PCA and recovered PCA are typically added separately to the PFS process, if desired they can be mixed prior to use in the PFS process. The difference between polymer control agent (1) and polymer control agent (2) are explained in more depth below.

In the preformed stabilizers, there are two potential and different sources of polymer control agent (PCA). These two different sources of polymer control agent account for 100% by weight of the polymer control agent present. It should also be noted, however, that the actual compound used as polymer control agent (1) may be the same or different than the actual compound used as polymer control agent (2).

The first source of polymer control agent is (1) fresh polymer control agent which is added separately to or used in the preformed stabilizer and/or the process of making the preformed stabilizer. In other words, fresh polymer control agent has not been used previously in the preformed stabilizer or polymer polyol process, and is utilized from the supplier without further modifications/changes to the purity of the material.

The second source of polymer control agent is (2) a recovered polymer control agent. This recovered polymer control agent is obtained from the purification of the crude polymer polyol (typically by vacuum distillation) and consists mainly of the polymer control agent used in the polymer polyol process. The recovered PCA is a mixture comprising up to 85% by weight of a component considered to be a PCA, with the remaining being components that may or may not be considered as PCAs as well. The remaining components are typically other volatile components from the polymer polyol process (i.e. residual unsaturated monomers, diluents, raw material impurities, etc.).

The total quantity of recovered polymer control agent (2) which may be employed in the present invention is at least about 5% by weight, preferably at least about 10%, more preferably at least about 15% and most preferably at least about 20% by weight, based on 100% by weight of total polymer control agent. The recovered polymer control agent (2) is also employed in amounts of less than or equal to 95% by weight, preferably less than or equal to about 90%, more preferably less than or equal to 85% and most preferably less than or equal to about 80% by weight, based on 100% by weight of total polymer control agent. The recovered polymer control agent (2) may be employed in any amount ranging between any combination of these lower and upper values, inclusive, e.g., from about 5% to about 95% by weight, preferably from about 10% to about 90% by weight, more preferably from about 15% to about 85% by weight and most preferably from about 20% to about 80% by weight, based on 100% by weight of total polymer control agent. The sum of the %'s by weight of recovered polymer control agent (2) and of fresh polymer control agent (1) totals 100% by weight of the total quantity of total polymer control agent present.

The total quantity of fresh polymer control agent (1) which may be employed in the present invention is from 5% by weight, preferably at least about 10%, more preferably at least about 15% and most preferably at least about 20% by weight, based on 100% by weight of total polymer control agent. The fresh polymer control agent (1) is also employed in amounts of less than or equal to 95% by weight, preferably less than or equal to about 90%, more preferably less than or equal to 85% and most preferably less than or equal to about 80% by weight, based on 100% by weight of total polymer control agent. The fresh polymer control agent (1) may be employed in any amount ranging between any combination of these lower and upper values, inclusive, e.g., from about 5% to about 95% by weight, preferably from about 10% to about 90% by weight, more preferably from about 15% to about 85% by weight and most preferably from about 20% to about 80% by weight, based on 100% by weight of total polymer control agent. The sum of the %'s by weight of recovered polymer control agent (2) and of fresh polymer control agent (1) totals 100% by weight of the total quantity of total polymer control agent present.

The quantity of total polymer control agent to be employed in the present invention is at least about 30% by weight, preferably at least about 35%, more preferably at least about 40% and most preferably at least about 45% by weight, based on the 100% by weight of all components which comprise the preformed stabilizer. The quantity of total polymer control agent is also employed in amounts of less than or equal to 80% by weight, preferably less than or equal to about 75%, more preferably less than or equal to 70% and most preferably less than or equal to about 65% by weight, based on the total weight of all components which comprise the preformed stabilizer. The amount of total polymer control agent may be employed in any amount ranging between any combination of these lower and upper values, inclusive, e.g., at least about 30% to about 80% by weight, preferably from about 35% to about 75% by weight, more preferably from about 40% to about 70% by weight and most preferably from about 45% to about 65% by weight, based on 100% by weight of the preformed stabilizer.

Suitable diluents (e) for the preformed stabilizers of the present invention include, for example, compounds such as, polyols, hydrocarbons, ethers etc., and mixtures thereof.

Suitable polyols to be used as a diluent (e) comprise, for example, poly(oxypropylene) glycols, triols and higher functionality polyols. Such polyols include poly(oxypropylene-oxyethylene) polyols; however, desirably the oxyethylene content should comprise less than about 50% by weight of 100% by weight of oxyalkylene groups. The ethylene oxide can be incorporated in any fashion along the polymer chain. Stated another way, the ethylene oxide can be either incorporated in internal blocks, as terminal blocks, or may be randomly distributed along the polymer chain. It is well known in the art that polyols contain varying amounts of non-induced unsaturation. The extent of unsaturation does not affect in any adverse way the formation of the polymer polyols in accordance with the present invention.

The polyols employed as a diluent can have hydroxyl numbers which vary over a wide range. In general, the hydroxyl numbers of the polyols employed in the invention can range from about 20 mg KOH/g polyol and higher, to about 280 mg KOH/g polyol and lower. The hydroxyl number is reported in mg KOH/g polyol and defined as the number of milligrams of potassium hydroxide required for the complete hydrolysis of the fully phthalated derivative prepared from 1 gram of polyol. The hydroxyl number can also be defined by the equation:

$$OH = (56.1 \times 1000 \times f)/m.w.$$

where:
OH=hydroxyl number of the polyol;
f=functionality, that is, average number of hydroxyl groups per molecule of the polyol;
and
m.w.=molecular weight of the polyol.

The exact polyol employed depends upon the end use of the polyurethane product to be produced. The molecular weight of the hydroxyl number is selected properly to result in flexible or semi-flexible foams or elastomers when the polymer polyol produced from the polyol is converted to a polyurethane. The polyols preferably possess a hydroxyl number of from about 50 mg KOH/g polyol to about 150 mg KOH/g polyol for semi-flexible foams and from about 30 mg KOH/g polyol to about 70 mg KOH/g polyol for flexible foams. Such limits are not intended to be restrictive, but are merely illustrative of the large number of possible combinations of the above polyol co-reactants.

Preferred polyol components to be used as diluents in the present invention typically include, for example, the alkylene oxide adducts of suitable starter materials having 4 or more hydroxyl groups such as, for example, pentaerythritol, sorbitol, diether of sorbitol, mannitol, diether of mannitol, arabitol, diether of arabitol, sucrose, oligomer of polyvinyl alcohol or glycidol, mixtures thereof, etc.

Generally, the quantity of diluent is 15% by weight, based on 100% by weight of the PFS (preformed stabilizer).

Suitable processes for preparing the preformed stabilizers are similar to known methods described in, for example, U.S. Pat. Nos. 5,196,476, 5,268,418, and 7,759,423, the disclosures of which are herein incorporated by reference. In general, the process of preparing the preformed stabilizer is similar to the process of preparing the polymer polyol. The temperature range is not critical and may vary from about 80 to about 150° C. or higher, and preferably from about 115 to about 125° C. or so. The catalyst and temperature should be selected such that the catalyst has a reasonable rate of decomposition with respect to the hold-up time in the reactor for a continuous flow reactor or the feed time for a semi-batch reactor.

Mixing conditions employed in this process are obtained by using a back mixed reactor (e.g. a stirred flask or stirred autoclave). The reactors of this type keep the reaction mixture relatively homogeneous and prevent localized high monomer to macromer ratios such as occur in tubular reactors, where all of the monomer is added at the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The combination of conditions selected for the preparation of the preformed stabilizer should not lead to cross-linking or gel formation in the preformed stabilizer which can adversely affect the ultimate performance in preparing the polymer polyol composition. Combinations of too low a diluent concentration, too high a macromer and/or monomer concentration, too high a catalyst concentration, too long of a reaction time, and too much unsaturation in the macromer can result in ineffective preformed stabilizer from cross-linking or gelling.

Preferred processes of preparing the preformed stabilizers herein are those as described in, for example, U.S. Pat. Nos. 5,196,476 and 5,268,418, the disclosures of which are hereby incorporated by reference. Preferred diluents and relative concentrations, ethylenically unsaturated monomers and relative concentrations, free-radical initiators and relative concentrations, and process conditions set forth in the references U.S. Pat. Nos. 5,196,476, 5,268,418 and 7,759,423.

The polymer polyols of the present invention comprise the free-radical, in-situ polymerization product of (A) a base polyol, (B) the novel preformed stabilizers described herein, and (C) one or more ethylenically unsaturated monomers in the presence of (D) at least one free-radical initiator, and optionally, (E) a chain transfer agent, and optionally, (F) a polymer control agent. The process for the preparation of polymer polyols comprises free-radically polymerizing (A) a base polyol, (B) the novel preformed stabilizers described herein, and (C) one or more ethylenically unsaturated monomers, in the presence of (D) at least one free-radical initiator, and optionally (E) a chain transfer agent, and optionally, (F) a polymer control agent, The resultant polymer polyols exhibit solids contents, i.e., from 20 to 70% by weight, based on 100% by weight of the resultant polymer polyol. It is preferred that the solids content of the polymer polyols ranges from 30 to 65%, or from 40 to 60% by weight. These polymer polyols also exhibit good viscosities, i.e. from 2000 to 15,000 mPa·s, and good filterability. By good filterability, it is meant that 100% of polymer polyol passes through a 700-mesh screen in less than 600 seconds. A suitable method for determining filterability is described in the Examples.

Suitable base polyols (A) for the polymer polyols of the present invention include, for example, base polyols such as, for example, polyether polyols. Suitable polyether polyols include those having a functionality of at least about 2, preferably at least about 2, and more preferably at least about 3. The functionality of suitable polyether polyols is less than or equal to about 8, preferably less than or equal to about 6, and most preferably less than or equal to about 5. The suitable polyether polyols may also have functionalities ranging between any combination of these upper and lower values, inclusive, such as for example, from at least about 2 to about 8, or from at least about 2 to about 6, or from at least about 3 to about 5. The OH numbers of suitable polyether polyols is at least about 20 mg KOH/g polyol, preferably at least about 25 mg KOH/g polyol, and most preferably at least about 30 mg KOH/g polyol. Polyether polyols typically also have OH numbers of less than or equal to about 400 mg KOH/g polyol, preferably less than or equal to about 300 mg KOH/g polyol, and most preferably less than or equal to about 200 mg KOH/g polyol. The suitable polyether polyols may also have OH numbers ranging between any combination of these upper and lower values, inclusive, such as, for example, from 20 to 400, or from 25 to 300, or from 30 to 200.

These polyether polyols may also have functionalities ranging from about 2 to about 8, preferably from about 2 to about 6, and most preferably from about 3 to about 5; and OH numbers ranging from about 20 mg KOH/g polyol to 400 mg KOH/g polyol, preferably from about 25 mg KOH/g polyol to about 300 mg KOH/g polyol, and most preferably from about 30 mg KOH/g polyol to about 200 mg KOH/g polyol.

Examples of such compounds include polyoxyethylene glycols, triols, tetrols and higher functionality polyols, polyoxypropylene glycols, triols, tetrols and higher functionality polyols, polyoxyalkylene glycols, triols, tetrols and higher functionality polyols, mixtures thereof, etc. Suitable starters or initiators for these compounds include, for example, ethylene glycol, propylene glycol, diethylene glycol, dipropylene glycol, tripropylene glycol, trimethyolpropane, glycerol, pentaerythritol, sorbitol, sucrose, ethylenediamine, toluene diamine, etc. By alkoxylation of the starter, a suitable polyether polyol for the base polyol component can be formed.

Other suitable base polyols for the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4- 1,6- and 1,8-dihydroxyoctant, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactane, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes, etc.

The alkylene oxide adducts of phosphorus and polyphosphorus acid are also useful polyols, These include ethylene oxide, 1,2-epoxy-propane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

Suitable preformed stabilizers to be used as component (B) for the polymer polyols are the novel preformed stabilizers described herein above.

The (C) ethylenically unsaturated monomers suitable for the polymer polyols of the present invention and the process of preparing these include those ethylenically unsaturated monomers described above with respect to the preparation of the preformed stabilizer. Other suitable monomers include, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the preformed stabilizer. Of the above monomers, the monovinylidene aromatic monomers, particularly styrene, and the ethylenically unsaturated nitriles, particularly acrylonitrile, are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred styrene and acrylonitrile are used in sufficient amounts such that the weight ratio of styrene to acrylonitrile (S:AN) may be from about 80:20 to 20:80, or from about 75:25 to 25:75. These ratios are suitable for polymer polyols and the processes of preparing them, regardless of whether they comprise the macromers or the preformed stabilizers of the present invention.

Overall, the quantity of ethylenically unsaturated monomer(s) present in the polymer polyols is at least about 20% by weight, based on 100% by weight of the polymer polyol. It is preferred that the solids content is from about 20 to about 70% by weight, or from about 30 to about 65% by weight, and or from about 40 to about 60% by weight.

Suitable free-radical initiators include those as described previously for the preparation of the preformed stabilizers. Among the useful initiators are those catalysts having a satisfactory half-life within the temperature ranges used in forming the polymer polyol, i.e. the half-life should be about 25% or less of the residence time in the reactor at any given time. Preferred initiators for this portion of the invention include acyl peroxides such as didecanoyl peroxide and dilauroyl peroxide, alkyl peroxides such as di-tert-butyl peroxide and dicumyl peroxide, peroxyketals such as 1,1-di(t-butylperoxy)cyclohexane, 1,1-di(t-amylperoxy)cyclohexane, peroxyesters such as t-butyl peroxy-2-ethylhexanoate (TBPEH), t-butylperpivalate, t-amyl peroctoate, t-amylperoxypivalate, 2,5-dimethyl-hexane-2,5-di-per-2-ethyl hexoate, t-butyl perneodecanoate, t-butylperbenzoate and 1,1-dimethyl-3-hydroxybutyl peroxy-2-ethylhexanoate, and azo catalysts such as azobis(isobutyronitrile), 2,2'-azo bis-(2-methoxylbutyronitrile), and mixtures thereof. Most preferred are the peroxyketals and peroxyesters described above, and azo catalysts.

The quantity of initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Suitable chain transfer agents (D) for the polymer polyols herein include, for example, known to be useful in polymer polyols and the processes of preparing polyols such as those described in, for example, U.S. Pat. Nos. 3,953,393, 4,119,586, 4,463,107, 5,324,774, 5,814,699 and 6,624,209, the disclosures of which are herein incorporated by reference. Some examples of suitable compounds to be used as chain transfer agents include mercaptans (preferably alkyl mercaptans), halogenated hydrocarbons (alkyl halides), ketones, enol-ethers and alkyl-substituted tertiary amines. Chain transfer agents are also commonly referred to as reaction moderators. These are known to control the molecular weight of the copolymerizate.

Suitable chain transfer agents include, for example, mercaptans including benzylmercaptan as well as alkyl mercaptans such as, for example, dodecylmercaptan, butylmercaptan, octylmercaptan, laurylmercaptan, cyclohexylmercaptan, etc.; alkyl-substituted tertiary amines include compounds such as, for example, triethylamine, tripropylamine, tributylamine, N,N-diethylethanol-amine, N-methylmorpholine, N-ethylmorpholine, N,N-diethylpiperazine, etc.; enol-ethers include, for example, (cyclohex-3-enylidenemethoxy-methyl)-benzene, etc.; halogenated hydrocarbons including, for example, carbon tetrachloride, carbon tetrabromide, chloroform, methylene chloride, etc. In accordance with the present invention, preferred chain transfer agents include toluene, ethylbenzene, triethylamine, dodecylmercaptan, octadecylmercaptan, etc.

Chain transfer agents are employed in amounts of from 0.1% by weight, preferably of at least about 1%, more preferably at least about 2% and most preferably at least about 3% by weight. Chain transfer agents are also employed in amounts of less than or equal to 30% by weight, preferably less than or equal to about 26%, more preferably less than or equal to 24% and most preferably less than or equal to about 21% by weight. The weight basis for the chain transfer agent is the total weight of all the components charged to reactor. The chain transfer agent may be employed in any amount ranging between any combination of these lower and upper values, inclusive, e.g., from 0.1% to about 30% by weight, preferably from about 1% to about 26% by weight, more preferably from about 2% to about 24% by weight and most preferably from about 3% to about 21% by weight.

Suitable polymer control agents (E) suitable for the invention include, for example, one or more monol which is typically an alcohol containing at least one carbon atom, such as methanol, ethanol, n-propanol, iso-propanol, n-butanol, sec.-butanol, t-butanol, n-pentanol, 2-pentanol, 3-pentanol, allyl alcohol, and the like, and mixtures of the same. The preferred monol is isopropanol. Other known polymer control agents include compounds such as, for example, ethylbenzene and toluene. In accordance with the present invention, the most preferred polymer control agents include isopropanol, ethanol, tert-butanol, toluene, ethylbenzene, etc.

Polymer control agents can be used in substantially pure form (i.e. as commercially available) or can be recovered in crude form from the polymer polyol process and reused as-is. For instance, if the polymer control agent is isopropanol, it can be recovered from the polymer polyol process and used at any point in a subsequent product campaign in which the isopropanol is present, such as the previously mentioned preformed stabilizer process. The amount of crude polymer control agent, i.e. recovered polymer control agent in the total polymer control agent can range anywhere from 5% up to 95% by weight.

Polymer polyols comprising the preformed stabilizers of the present invention are prepared by utilizing the processes as disclosed in, for example, U.S. Pat. Nos. 4,148,840, 4,242,249, 4,954,561, 4,745,153, 5,494,957, 5,990,185, 6,455,603, 4,327,005, 4,334,049, 4,997,857, 5,196,476, 5,268,418, 5,854,386, 5,990,232, 6,013,731, 5,554,662, 5,594,066, 5,814,699 and 5,854,358, the disclosures of which are herein incorporated by reference. As described therein, a low monomer to polyol ratio is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

In the process of preparing polymer polyols, the temperature range is not critical, and may vary from about 100° C. to about 140° C. or perhaps greater, or it may vary from 115° C. to 125° C. As has been noted herein, the initiator and temperature should be selected such that the initiator has a reasonable rate of decomposition with respect to the hold-up time in the reactor for a continuous flow reactor or the feed time for a semi-batch reactor.

The mixing conditions employed are those obtained using a back-mixer (e.g., a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The utilization of the processes as described in U.S. Pat. Nos. 5,196,476 and 5,268,418 are preferred in this aspect of the present invention since these allow for the preparation of polymer polyols with a wide range of monomer compositions, polymer contents and polymer polyols that could not be otherwise prepared with the necessary requisite stability. However, whether the utilization of the processes disclosed in U.S. Pat. Nos. 5,916,476 and 5,268,418 are essential depends on whether the process parameters are such that a satisfactory polymer polyol can be prepared without using either of these processes.

As one skilled in the art knows and understands, various factors including, for example, the free-radical initiator, the solids content, the weight ratio of S:AN, process conditions, reactor materials of construction, etc., will affect the optimum quality of preformed stabilizer and of the polymer polyol.

For instance, during the polymer polyol reaction, a reactor composed of carbon steel may behave differently than one composed of stainless steel during the process, depending upon process conditions. It has been found that the combination of a peroxide initiator in a PMPO process with a carbon steel reactor results in a higher level of polymer fouling than when a peroxide initiator is used in a PMPO process with a stainless steel reactor. This limitation is mitigated by using an azo initiator or a peroxide blend to give the same degree of low polymer fouling when preparing a PMPO in a carbon steel reactor as in a stainless steel reactor.

It has also surprisingly been found that the use of a peroxide initiator in a polymer polyol process can offer advantages versus an azo initiator when polymer polyol properties are not behaving optimally. For instance, using a peroxide initiator can result in a passing filtration test when the use of an azo initiator results in a failing filtration test.

The polymer polyols of the present invention comprise dispersions in which the polymer particles (the same being either individual particles or agglomerates of individual particles) are relatively small in size and, in the preferred embodiment, are all essentially less than about one to three microns. However, when high contents of styrene are used, the particles will tend to be larger; but the resulting polymer polyols are highly useful, particularly when the end use application requires as little scorch as possible. In a preferred embodiment, essentially all of the product (i.e., about 99% by weight or more) will pass through the filter employed in the filtration hindrance (filterability) test that will be described in conjunction with the Examples. This insures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50% by weight of the product passes through the filter. Some applications may also find useful products in which only about 20% by weight or even less passes through the filter.

In accordance with the present invention, the preformed stabilizer is present in an amount sufficient to insure that satisfactory stabilization will result in the desired filtration hindrance, centrifugible solids level and viscosity. In this regard, the quantity of preformed stabilizer generally ranges from about 1 to about 20% (or from about 2 to about 15%) by weight, based on the total feed. As one skilled in the art knows and understands, various factors including, for example, the free-radical initiator, the solids content, the weight ratio of S:AN, process conditions, reactor materials of construction, etc., will affect the optimum quantity of preformed stabilizer.

Polyurethanes, preferably polyurethane foams, comprising the polymer polyols and processes for their production are also part of the present invention. Suitable polymer polyols for these polyurethanes include those prepared from the novel preformed stabilizers described herein. These polyurethanes comprise the reaction product of a polyisocyanate component or prepolymer thereof, with an isocyanate-reactive component comprising the polymer polyols of the invention. The processes for preparing these polyurethanes comprise reacting a polyisocyanate component or prepolymer thereof, with an isocyanate-reactive component comprising the polymer polyols of the present invention.

The process of preparing the flexible polyurethane foams comprises reacting (I) a diisocyanate and/or polyisocyanate component, with (II) an isocyanate-reactive component comprising the novel polymer polyols described herein, in the presence of (III) one or more catalysts, (IV) one or more blowing agents and, optionally, (V) one or more surfactants. In addition, crosslinking agents, chain extenders, other isocyanate-reactive components, etc., as described herein above, as well as various other additives and auxiliary agents may also be present.

Suitable diisocyanate and/or polyisocyanates for component (I) comprise those known in the art, to be suitable for the preparation of flexible polyurethane foams. The polyisocyanates may be di- or poly-functional, and include, for example, (cyclo)aliphatic di- and/or polyisocyanates, aromatic di- and/or polyisocyanates, and araliphatic di- and/or polyisocyanates. Some specific examples of suitable aromatic polyisocyanates and aromatic diisocyanates include compounds such as toluene diisocyanate, diphenylmethane diisocyanate, polymethylene polyphenyl polyisocyanate, etc., mixtures or blends of these di- and/or polyisocyanates with one another and/or with other di- and/or polyisocyanates, including (cyclo)aliphatic isocyanates and/or araliphatic isocyanates may also be used.

Suitable compounds to be used as component (II), the isocyanate-reactive component, herein for the preparation of flexible polyurethane foams include the novel polymer polyols described herein. In accordance with the present invention, the isocyanate-reactive component (II) may additionally comprise a conventional (i.e., non-solids containing) isocyanate-reactive component such as, for example, a polyoxyalkylene polyol, a polyether polyol, a polyester polyol, a polythioether, a polyacetal, a polycarbonate, a polycarbonate ether polyol, etc., and mixtures thereof. These isocyanate-reactive compounds having a functionality of from 2 to 8, or from 2 to 6, or from 2 to 4, and a number average molecular weight of from 1000 to 12,000, or from 1000 to 8,000, or from 2000 to 6000. In addition, lower molecular weight isocyanate-reactive components such as crosslinkers and/or chain extenders may be used. These lower molecular weight isocyanate-reactive components include chain extenders which may have functionalities of 2 and number average molecular weights ranging from 61 to 500; and cross linking agents which may have functionalities of 3 to 4 and number average molecular weights ranging from 92 to less than 1000, or from 92 to less than or equal to 750. Examples of suitable chain extenders include ethylene glycol, 2-methyl-1,3-propanediol, 1,2- and 1,3-propanediol, 1,3- and 1,4- and 2,3-butanediol, 1,6-hexanediol, diethylene glycol, triethylene glycol, dipropylene glycol, etc. Some examples of suitable crosslinking agents include glycerol, trimethylolpropane, pentaerythritol, diethanolamine, triethanolamine, etc. It is also possible to use a polyether polyol that contains a high ethylene oxide content.

At least one polyurethane catalyst (III) is required to catalyze the reactions of the monol, polyols and water with the diisocyanate and/or polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Suitable organoamine catalysts are tertiary amines such as trimethylamine, triethylamine, triethylenediamine, bis(2,2'-dimethylamino)ethyl ether, N-ethylmorpholine, diethylenetriamine, and the like. Preferred catalysts are amine catalysts such as, for example, bis(dimethylaminoethyl)ether in dipropylene glycol and triethylene diamine in dipropylene glycol. These are commercially available as Niax A-1 and Niax A-33, respectively.

The polyurethane catalysts are typically used in an amount within the range of about 0.05 to about 3 parts by weight, more preferably from about 0.1 to about 2 parts, per 100 parts by weight of isocyanate-reactive mixture.

Suitable (IV) blowing agents for the present invention include, for example chemical blowing agents and/or physical blowing agents. Some examples of the suitable blowing agents for the present invention include water, formic acid, carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal, etc. It is possible to use a mixture of blowing agent in the present invention. When using a physical blowing agent, this is typically added to the isocyanate-reactive component of the system. These can, however, also be added in the polyisocyanate component or to a combination of both the isocyanate-reactive component and to the polyisocyanate component. Blowing agents may also be used in the form of an emulsion of the isocyanate-reactive component. Combinations of water and one or more auxiliary blowing agents are also suitable herein. In addition, water may be used as the sole blowing agent.

The amount of blowing agent or blowing agent mixture used is from 0.5 to 20%, preferably from 0.75 to 10% by weight, based in each case on 100% by weight of component (II). When water is the blowing agent, it is typically present in an amount of from 0.5 to 10% by weight, and preferably from 0.75 to 7% by weight, based on 100% by weight of component (II). The addition of water can be effected in combination with the use of the other blowing agents described.

Surfactants (V) may be used to prepare the foams. Surfactants are known to help stabilize the foam until it cures. Suitable surfactants for the invention are those well known in the polyurethane industry. A wide variety of organosilicone surfactants are commercially available. Examples of suitable surfactants include DC-5043, DC-5164 and DC-5169, as well as Niax L-620, a product of Momentive Performance Materials, and Tegostab B8244, a product of Evonik-Goldschmidt. Many other silicone surfactants known to those in the art may be substituted for these suitable silicones. The surfactant is typically used in an amount within the range of about 0.1 to 4, preferably from about 0.2 to 3, parts per 100 parts of isocyanate-reactive mixture.

Other optional components that may be present in the flexible foam formulations include, for example, flame retardants, antioxidants, pigments, dyes, liquid and solid fillers, etc. Such commercial additives are included in the foams in conventional amounts when used.

The flexible foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor. Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

In accordance with the present invention, the flexible foams are prepared at isocyanate indices ranges from 70 to 130, or from 80 to 120, or from 90 to 110. The term "isocyanate index", which may also be referred to as the NCO index, is defined herein as the ratio of reactive isocyanate groups (equivalents) to active hydrogen groups (equivalents), multiplied by 100%.

Although less preferred, a prepolymer approach to making the foams can also be used. In this approach, a significant portion of the isocyanate-reactive mixture is reacted with the diisocyanate and/or polyisocyanate, and the resulting prepolymer is then reacted with the remaining components.

In a first embodiment, the present invention is directed to a preformed stabilizer comprising the free-radical polymerization product of (a) at least one ethylenically unsaturated macromer; (b) at least one ethylenically unsaturated monomer; and (c) at least one free-radical polymerization initiator; in the presence of (d) a polymer control agent which comprises (1) from 5 to 95% by weight of fresh polymer control agent, and (2) from 5 to 95% by weight of a recovered polymer control agent; and, optionally, (e) a diluent; wherein the recovered polymer control agent comprises from 10 to 1500 ppm, based on the weight of the recovered polymer control agent, of an inhibitor comprising at least one of a phenolic containing compound, a quinone containing compound, an amine containing compound, and a N-nitrosophenylhydroxylamine containing compound, and wherein the %'s by weight of (d)(1) and (d)(2) total 100% by weight of (d).

In a second embodiment, the invention is directed to the preformed stabilizer according to the first embodiment wherein (c) the free-radical initiator comprises a peroxide initiator.

In a third embodiment, the invention is directed to the preformed stabilizer according to the first and/or second embodiments wherein (c) the peroxide initiator comprises at least one of an acyl peroxide, an alkyl peroxide, a peroxyketal, and a peroxyester.

In a fourth embodiment, the invention is directed to the preformed stabilizer according to at least one of the first through the third embodiments wherein (c) the peroxide initiator comprises at least one of 1,1-di(t-butylperoxy)-cyclohexane, 1,1-di(t-amylperoxy)cyclohexane, t-butyl peroxy-2-ethylhexanoate, t-butylperpivalate, t-amyl peroctoate, t-amylperoxypivalate, 2,5-dimethyl-hexane-2,5-di-per-2-ethyl hexoate, t-butyl perneodecanoate, t-butylperbenzoate, and 1,1-dimethyl-3-hydroxybutyl peroxy-2-ethylhexanoate.

In a fifth embodiment, the invention is directed to the preformed stabilizer according to at least one of the first through the fourth embodiments wherein (d)(2) the recovered polymer control agent is essentially free of turbidity/particulate matter.

In a sixth embodiment, the invention is directed to the preformed stabilizer according to at least one of the first through the fifth embodiments, wherein (d) the polymer control agent comprises at least one of methanol, ethanol, isopropanol, ethyl benzene, dodecyl mercaptan, octadecyl-mercaptan, toluene, and triethylamine.

In a seventh embodiment, the invention is directed to the preformed stabilizer according to at least one of the first through the sixth embodiments wherein (a) the ethylenically unsaturated macromer comprises the reaction product of (i) a starter compound having a functionality of 2 to 8 and a hydroxyl number of 20 to 50, (ii) a hydroxyl-reactive compound that contains reactive unsaturation, and optionally, (iii) a diisocyanate.

In an eighth embodiment, the invention is directed to the preformed stabilizer according to at least one of the first through the seventh embodiments wherein (a) the ethylenically unsaturated macromer comprises the reaction product of (i) a starter compound having a functionality of 2 to 8 and a hydroxyl number of 20 to 50, (ii) from 0.1 to 3% by weight, based on 100% by weight of (i), (ii) and (iii), of a hydroxyl-reactive compound that contains reactive unsaturation, and (iii) from greater than 0 to 3% by weight, based on 100% by weight of the components (i), (ii) and (iii), of a diisocyanate.

In a ninth embodiment, the invention is directed to the preformed stabilizer according to the seventh and/or the eighth embodiments wherein (ii) the hydroxyl-reactive compound that contains reactive unsaturation comprises at least one of methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, and adducts of toluene diisocyanate and 2-hydroxypropyl acrylate.

In a tenth embodiment, the present invention is directed to the preformed stabilizer according to at least one of the seventh through the ninth embodiments wherein (iii) the diisocyanate comprises at least one of 2,2'-diphenylmethane diisocyanate, 2,4'-diphenylmethane diisocyanate, 4,4'-diphenylmethane diisocyanate, toluene diisocyanate, isophorone diisocyanate, hexamethylene diisocyanate, and 4,4'-methylenebis(cyclohexyl isocyanate).

In an eleventh embodiment, the invention is directed to a preformed stabilizer according to at least one of the first through the tenth embodiments wherein (b) the ethylenically unsaturated monomer comprises a mixture of styrene and acrylonitrile.

In a twelfth embodiment, the invention is directed to the preformed stabilizer according to at least one of the first through the eleventh embodiments wherein (b) the ethylenically unsaturated monomer comprises a mixture of styrene and acrylonitrile in a weight ratio of 80:20 to 20:80.

In a thirteenth embodiment, the invention is directed to the preformed stabilizer according to at least one of the first through the twelfth embodiments wherein (b) the ethylenically unsaturated monomer comprises a mixture of styrene and acrylonitrile in a weight ratio of 75:25 to 25:75.

In a fourteenth embodiment, the invention is directed to the preformed stabilizer according to at least one of the first through the thirteenth embodiments wherein (d) the polymer control agent comprises (1) from 10 to 90% by weight of fresh polymer control agent, and (2) from 10 to 90% by weight of recovered polymer control agent, with the %'s by weight of (1) and (2) totaling 100% by weight of (d).

In a fifteenth embodiment, the invention is directed to the preformed stabilizer according to at least one of the first through the fourteenth embodiments wherein (d) the polymer control agent comprises (1) from 15 to 85% by weight of fresh polymer control agent, and (2) from 15 to 85% by weight of recovered polymer control agent, with the %'s by weight of (d)(1) and (d)(2) totaling 100% by weight of (d).

In a sixteenth embodiment, the invention is directed to the preformed stabilizer according to at least one of the first through the fifteenth embodiments wherein (d) the polymer control agent is present in an amount of from 30 to 80% by weight, based on the total weight of the preformed stabilizer.

In a seventeenth embodiment, the invention is directed to the preformed stabilizer according to at least one of the first through the sixteenth embodiments wherein (d)(2) the recovered polymer control agent comprises a mixture of greater than 0 up to 85% by weight of a component known to be a polymer control agent, and of greater than 0 up to 15% by weight of volatile components, with the sum of the %'s by weight totaling 100% by weight of (d)(2).

In an eighteenth embodiment, the invention is directed to a process for the preparation of a preformed stabilizer comprising (1) free-radically polymerizing: (a) at least one ethylenically unsaturated macromer; (b) at least one ethylenically unsaturated monomer; and (c) at least one free-radical polymerization initiator; in the presence of (d) a polymer control agent which comprises (1) from 5 to 95% by weight of fresh polymer control agent; and (2) from 5 to 95% by weight of recovered polymer control agent; wherein the recovered polymer control agent comprises from 10 to 1500 ppm, based on the weight of the recovered polymer control agent, of an inhibitor comprising at least one of a phenolic containing compound, an amine containing compound, a quinone containing compound, and a N-nitrosophenyl-hydroxylamine containing compound, and wherein the %'s by weight of (d)(1) and (d)(2) total 100% by weight of (d); and optionally, (e) a diluent.

In a nineteenth embodiment, the invention is directed to the process according to the eighteenth embodiment wherein (c) the free-radical initiator comprises a peroxide initiator.

In a twentieth embodiment, the invention is directed to the process according to the eighteenth and/or the nineteenth embodiments wherein (c) the peroxide initiator comprises at least one of an acyl peroxide, an alkyl peroxide, a peroxyketal, and a peroxyester.

In a twenty-first embodiment, the invention is directed to the process according to at least one of the eighteenth through the twentieth embodiments, wherein (c) the peroxide initiator comprises at least one of 1,1-di(t-butylperoxy)cyclohexane, 1,1-di(t-amylperoxy)cyclohexane, t-butyl peroxy-2-ethylhexanoate, t-butylperpivalate, t-amyl peroctoate, t-amylperoxypivalate, 2,5-dimethyl-hexane-2,5-di-per-2-ethyl hexoate, t-butyl perneodecanoate, t-butylperbenzoate, and 1,1-dimethyl-3-hydroxybutyl peroxy-2-ethylhexanoate.

In a twenty-second embodiment, the invention is directed to the process according to at least one of the eighteenth through the twenty-first embodiments wherein (d)(2) the recovered polymer control agent is essentially free of turbidity/particulate matter.

In a twenty-third embodiment, the invention is directed to the process according to at least one of the at least one of the eighteenth through the twenty-second embodiments wherein (d) the polymer control agent comprises at least one of methanol, ethanol, isopropanol, ethyl benzene, dodecyl mercaptan, octadecylmercaptan, toluene, and triethylamine.

In a twenty-fourth embodiment, the invention is directed to the process according to at least one of the twenty-first through the eighteenth through the twenty-third embodiments wherein (a) the ethylenically unsaturated macromer comprises the reaction product of (i) a starter compound having a functionality of 2 to 8 and a hydroxyl number of 20 to 50, (ii) a hydroxyl-reactive compound that contains reactive unsaturation, and optionally (iii) a diisocyanate.

In a twenty-fifth embodiment, the invention is directed to the process according to at least one of the eighteenth through the twenty-fourth embodiments wherein (a) the ethylenically unsaturated macromer comprises the reaction product of (i) a starter compound having a functionality of 2 to 8 and a hydroxyl number of 20 to 50, (ii) from 0.1 to 3% by weight, based on 100% by weight of (i), (ii) and (iii), of a hydroxyl-reactive compound that contains reactive unsaturation, and (iii) from greater than 0 to 3% by weight, based on 100% by weight of the components (i), (ii) and (iii), of a diisocyanate.

In a twenty-sixth embodiment, the invention is directed to the process according to at least one of the eighteenth through the twenty-fifth embodiments wherein (ii) the hydroxyl-reactive compound that contains reactive unsaturation comprises at least one of methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, and adducts of toluene diisocyanate and 2-hydroxypropyl acrylate.

In a twenty-seventh embodiment, the invention is directed to the process according to at least one of the eighteenth through the twenty-sixth embodiments wherein (iii) the diisocyanate comprises at least one of 2,2'-diphenylmethane diisocyanate, 2,4'-diphenylmethane diisocyanate, 4,4'-diphenylmethane diisocyanate, toluene diisocyanate, isophorone diisocyanate, hexamethylene diisocyanate, and 4,4'-methylenebis(cyclohexyl isocyanate).

In a twenty-eighth embodiment, the invention is directed to process of according to at least one of the eighteenth through the twenty-seventh embodiments, wherein (b) the ethylenically unsaturated monomer comprises a mixture of styrene and acrylonitrile.

In a twenty-ninth embodiment, the invention is directed to the process according to at least one of the eighteenth through the twenty-eighth embodiments wherein (b) the ethylenically unsaturated monomer comprises a mixture of styrene and acrylonitrile in a weight ratio of 80:20 to 20:80.

In a thirtieth embodiment, the invention is directed to the process according to at least one of the eighteenth through the twenty-ninth embodiments wherein b) the ethylenically unsaturated monomer comprises a mixture of styrene and acrylonitrile in a weight ratio of 75:25 to 25:75.

In a thirty-first embodiment, the invention is directed to the process according to at least one of the eighteenth through the thirtieth embodiments wherein (d) the polymer control agent comprises (d)(1) from 10 to 90% by weight of fresh polymer control agent, and (d)(2) from 10 to 90% by weight of recovered polymer control agent, with the %'s by weight of (d)(1) and (d)(2) totaling 100% by weight of (d).

In a thirty-second embodiment, the invention is directed to the process according to at least one of the eighteenth through the thirty-first embodiments wherein (d) the polymer control agent comprises (d)(1) from 15 to 85% by weight of fresh polymer control agent, and (d)(2) from 15 to 85% by weight of recovered polymer control agent, with the %'s by weight of (d)(1) and (d)(2) totaling 100% by weight of (d).

In a thirty-third embodiment, the invention is directed to the process according to at least one of the eighteenth through the thirty-second embodiments wherein (d) the polymer control agent is present in an amount of from 30 to 80% by weight, based on the total weight of the preformed stabilizer.

In a thirty-fourth embodiment, the invention is directed to the process according to at least one of the eighteenth through the thirty-third embodiments wherein (d)(2) the recovered polymer control agent comprises a mixture of greater than 0 up to 85% by weight of a component known to be a polymer control agent, and of greater than 0 up to 15% by weight of volatile components, with the sum of the %'s by weight totaling 100% by weight of (d)(2).

In a thirty-fifth embodiment, the invention is directed to a polymer polyol comprising the free-radical, in-situ polymerization product of: (A) a base polyol; (B) the preformed stabilizer according to at least one of the first through the eighteenth embodiments; with (C) at least one ethylenically unsaturated monomer; in the presence of (D) a free-radical polymerization initiator; and, optionally, (E) a chain transfer agent; and optionally, (F) a polymer control agent.

In a thirty-sixth embodiment, the invention is directed to the polymer polyol according to the thirty-fifth embodiment wherein (A) the base polyol has a hydroxyl number ranging from 20 to 400 and a functionality of from 2 to 8.

In a thirty-seventh embodiment, the invention is directed to the polymer polyols according to the thirty-fifth and/or the thirty-sixth embodiments, wherein (A) the base polyol has a hydroxyl number of from 25 to 300 and a functionality of from 2 to 6.

In a thirty-eighth embodiment, the invention is directed to the polymer polyols according to at least one of the thirty-fifth through the thirty-seventh embodiments, wherein (A) the base polyol has a hydroxyl number of 30 to 200 and a functionality of 3 to 5.

In a thirty-ninth embodiment, the invention is directed to the polymer polyols according to at least one of the thirty-fifth through the thirty-eighth embodiments wherein (C) the ethylenically unsaturated monomer comprises a mixture of styrene and acrylonitrile.

In a fortieth embodiment, the invention is directed to the polymer polyols according to at least one of the thirty-fifth through the thirty-ninth embodiments wherein (C) the ethylenically unsaturated monomer comprises a mixture of styrene and acrylonitrile in a weight ratio of 80:20 to 20:80, or preferably in a weight ratio of 75:25 to 25:75.

In a forty-first embodiment, the invention is directed to the polymer polyols according to at least one of the thirty-fifth through the fortieth embodiments wherein (C) the ethylenically unsaturated monomer is present in an amount of from 20 to 70% by weight, or preferably from 30 to 65% by weight, or more preferably from 40 to 60% by weight.

In a forty-second embodiment, the invention is directed to the process for the preparation of polymer polyols which comprised (I) free-radically polymerizing (A) a base polyol; (B) a preformed stabilizer according to at least one of the first through the eighteenth embodiments; with (C) at least one ethylenically unsaturated monomer; in the presence of (D) a free-radical polymerization initiator; and, optionally, (E) a chain transfer agent; and optionally, (F) a polymer control agent.

In a forty-third embodiment, the invention is directed to the process according to the forty-second embodiment wherein (A) the base polyol has a hydroxyl number ranging from 20 to 400 and a functionality of from 2 to 8.

In a forty-fourth embodiment, the invention is directed to the process according to at least one of the forty-second and/or forty-third embodiments wherein (A) the base polyol has a hydroxyl number of from 25 to 300 and a functionality of from 2 to 6.

In a forty-fifth embodiment, the invention is directed to the process according to at least one of the forty-second through the forty-fourth embodiments wherein (A) the base polyol has a hydroxyl number of 30 to 200 and a functionality of 3 to 5.

In a forty-sixth embodiment, the invention is directed to the process according to at least one of the forty-second through the forty-fifth embodiments wherein (C) the ethylenically unsaturated monomer comprises a mixture of styrene and acrylonitrile.

In a forty-seventh embodiment, the invention is directed to the process according to at least one of the forty-second through the forty-sixth embodiments wherein (C) the ethylenically unsaturated monomer comprises a mixture of styrene and acrylonitrile in a weight ratio of 80:20 to 20:80, or preferably in a weight ratio of 75:25 to 25:75.

In a forty-eighth embodiment, the invention is directed to the process according to at least one of the forty-second through the forty-seventh embodiments wherein (C) the ethylenically unsaturated monomer is present in an amount of from 20 to 70% by weight, or preferably from 30 to 65% by weight, or more preferably from 40 to 60% by weight.

In a forty-ninth embodiment, the invention is directed to a polyurethane foam comprising the reaction product of (I) a diisocyanate and/or a polyisocyanate component; with (II) an isocyanate-reactive component comprising the polymer polyol according to at least one of the thirty-fifth through the forty-first embodiments; in the presence of (III) a catalyst; (IV) a blowing agent; and/or (V) a surfactant.

In a fiftieth embodiment, the invention is directed to the process for the preparation of a polyurethane foam comprising reacting (I) a diisocyanate and/or a polyisocyanate component; with (II) an isocyanate-reactive component comprising the polymer polyol according to at least one of the thirty-fifth through the forty-first embodiments; in the presence of (III) a catalyst; (IV) a blowing agent; and/or (V) a surfactant.

The following examples further illustrate details for the preparation and use of the compositions of this invention. The invention, which is set forth in the foregoing disclosure, is not to be limited either in spirit or scope by these examples.

Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the examples.

Polyol 1: A propylene oxide adduct of sorbitol containing 12% ethylene oxide as a cap with a hydroxyl number of 33.

Polyol 2: A propylene oxide adduct of glycerine containing 13% ethylene oxide with a hydroxyl number of 52 and having a viscosity of 520 mPa·s PCA: Isopropanol, a polymer control agent TMI: Isopropenyl dimethyl benzyl isocyanate (an unsaturated aliphatic isocyanate) sold as TMI® by Allnex Catalyst A: Bismuth neodecanoate, commercially available under the name CosCat 83 from Vertellus Initiator A: tertiary-butyl peroxy-2-ethylhexanoate, commercially available as TBPEH from United initiators Initiator B: tertiary-Amyl peroxypivalate, a free-radical polymerization initiator, commercially available as Trigonox 125-C75 from Nouryon.

Initiator C: 1,1-di(tert-amylperoxy)cyclohexane, a free-radical polymerization initiator, commercially available as Trigonox 122-C80 from Nouryon Initiator D: tert-amyl peroxy-2-ethylhexyl carbonate, a free-radical polymerization initiator, commercially available from Nouryon under the tradename Trigonox® 131

Initiator E: 2,2'-azobisisobutyronitrile, a free-radical polymerization initiator commercially available as VAZO® 64 from Chemours Viscosity: Dynamic viscosities reported in mPa·s and measured on an Anton-Paar SVM 3000 viscometer at 25° C. that has been demonstrated to give equivalent results as can be generated with ASTM-D4878-15. The instrument was calibrated using mineral oil reference standards of known viscosity.

Filtration: Filterability was determined by diluting one part by weight sample (e.g. 200 grams) of polymer polyol with two parts by weight anhydrous isopropanol (e.g. 400 grams) to remove any viscosity-imposed limitations and using a fixed quantity of material relative to a fixed cross-sectional area of screen (e.g.

1⅛ in. diameter), such that all of the polymer polyol and isopropanol solutions passes by gravity through a 700-mesh screen. The 700-mesh screen is made with a Dutch twill weave. The actual screen used had a nominal opening of 30 microns. The amount of sample which passed through the screen within 600 seconds was reported in percent, and a value of 100 percent indicates that over 99 weight percent passed through the screen.

Recovered PCA Composition:

For a continuous process, the composition of the recovered PCA varies with time. For a composition in which the polymer control agent comprises isopropanol, the composition of the recovered PCA will typically fall within the ranges shown in Table 1. For any recovered PCA, the sum of all components as shown in Table 1 totals 100% by weight of the recovered PCA.

TABLE 1

| Recovered PCA Composition | |
| --- | --- |
| Component | % by weight |
| Isopropanol | 65-86 |
| Acrylonitrile | 1-17 |
| Styrene | 1-12 |
| Water | 1-10 |
| Isobutyronitrile | 0.01-8.0 |
| Ethylbenzenes, xylenes, toluenes | 0.01-0.3 |

Recovered PCA Study:

To determine the effect of various inhibitors on the stability and appearance of the recovered polymer control agent (PCA), the inhibitor was placed in 1000 g of recovered PCA at the specified levels. All samples were stirred at room temperature under nitrogen for 20 minutes. After this, all samples were clear in appearance. Then, the samples were placed in a 40'C oven for 4 weeks, an d then in a 50° C. oven for 2 weeks. At the end of the 6 weeks, the physical appearance was assessed and is recorded in Table 2.

TABLE 2

Effect of Inhibitors on Recovered PCA

| Examples | Inhibitor | Target ppm | Appearance[1] |
| --- | --- | --- | --- |
| 1 | None | — | Turbid |
| 2 | Tertiary-butyl catechol | 50 | Clear |
| 3 | Phenothiazine | 50 | Clear |
| 4 | 1,4-benzoquinone | 50 | Clear |
| 5 | 4-Methoxyphenol | 50 | Clear |
| 6 | L-Ascorbic acid | 50 | Turbid |
| 7 | Octodecyl 3-(3,5-di-tert-butyl-4-hydroxyphenyl)propionate | 100 | Clear |
| 8 | 3,5-bis(1,1-dimethylethyl)-4-hydroxy-benzenepropanoic acid, branched $C_{13}$-$C_{15}$ alkyl esters | 100 | Clear |

TABLE 2-continued

Effect of Inhibitors on Recovered PCA

| Examples | Inhibitor | Target ppm | Appearance[1] |
|---|---|---|---|
| 9 | Dioctadecyl 3,3'-thiodipropionate | 100 | Turbid |
| 10 | 2,2'-thiodiethylene bis[3-(3,5-di-tert-butyl-4-hydroxyphenyl)propionate] | 100 | Clear |
| 11 | 4,4'-thiobis(6-tert-butyl-o-cresol) | 100 | Clear |
| 12 | aluminum N-nitrosophenylhydroxylamine (TAS) | 100 | Clear |
| 13 | a-tocopherol | 100 | Clear |

[1]appearance after 6 weeks (4 weeks in a 40° C. oven, followed by 2 weeks in a in a 50° C. oven)

As can be seen, the recovered PCA was clear (i.e. no turbidity) in Examples 2, 3, 4, 5, 7, 8, 10, 11, 12 and 13. These Examples each illustrate a stable PCA system, in which the PCA remains clear, and shows no signs of visible solids/turbidity.

Example 1 and 12 from Table 2 were scaled up by placing the indicated amount of the inhibitor as shown in Table 2 in a metal can containing 10,000 g of recovered PCA. This gave Example 14 (no additive) and Example 15 (100 ppm TAS). See Table 2A. Example 14 was turbid, whereas Example 15 was clear after 3 weeks in a 50'C oven. Example 15 also illustrates a stable PCA system.

TABLE 2A

Scale Up of Examples 1 and 12

| Examples | Inhibitor | Target ppm | Appearance[1] |
|---|---|---|---|
| 14 | None | — | turbid |
| 15 | aluminum N-nitrosophenyl-hydroxylamine (TAS) | 100 | Clear |

[1]appearance after 3 weeks in a 50° C. oven

Macromer Preparation:

Macromer A: Prepared by heating Polyol 1 (3000 g) with TMI (62 g) and Catalyst A (200 ppm) at 75° C. for 3 hours.

Preformed Stabilizer (PFS) Preparation:

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulation is disclosed in Table 3.

TABLE 3

Preformed Stabilizer

| Component | Example 16—Comparative | Example 17 |
|---|---|---|
| PCA | Example 14 | Example 15 |
| PCA Type | Isopropanol | Isopropanol |
| PCA, wt %* | 63.5% | 63.5% |
| Macromer type | A | A |
| Macromer, wt. % | 21.5% | 21.5% |
| Monomer, wt. % | 14.9% | 14.9% |
| Styrene/acrylonitrile ratio | 50:50 | 50:50 |
| Initiator A, wt. % | 0.1% | 0.1% |
| Particle Size, microns | 1.303 | 0.950 |

* 81.6% is recovered PCA from Examples 14 and 15, respectively. The remaining 18.4% is fresh isopropanol.

As can be seen, the inventive PFS (i.e. Example 17) has better quality, as evidenced by the lower particle size relative to the comparative PFS (i.e. Example 16).

Polymer Polyol Preparation:

Table 4 relates to the preparation of the polymer polyol of the present specification. The polymer polyol was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt. % total polymer in the product was calculated from the concentrations of residual monomers measured in the crude polymer polyol before stripping.

TABLE 4

Formulations for Polymer Polyol

| Formulation | Example 18 | Example 19 |
|---|---|---|
| Polyol | 2 | 2 |
| Polyol (wt % in feed) | 44.8% | 44.8% |
| PFS | Example 16 | Example 17 |
| PFS (wt % in feed) | 8.2% | 8.2% |
| Styrene (wt. % in feed) | 30.5% | 30.5% |
| Acrylonitrile (wt. % in feed) | 16.3% | 16.3% |

TABLE 4-continued

Formulations for Polymer Polyol

| Formulation | Example 18 | Example 19 |
|---|---|---|
| Initiator B (wt. % in feed) | 0.19% | 0.19% |
| Initiator C (wt. % in feed) | 0.012% | 0.012% |
| Total Polymer (wt. %) | 48.5% | 48.7% |
| Viscosity mPa · s@25° C. | 4613 | 4562 |
| Filterability - 700 mesh (seconds) | 189 | 187 |
| Mean particle size (microns) | 0.938 | 0.906 |

As can be seen from the examples in Table 4, the use of the novel preformed stabilizer improved the performance of the PMPO process relative to the comparative example. As is known by one skilled in the art, a higher solids level is expected to increase the PMPO viscosity. Yet the inventive example has lower viscosity even at higher solids level. Also desirable is lower particle size, which is achieved by the invention.

Tables 5 and 6 demonstrate the effect that the different materials of construction for the reactor can have when different initiators (e.g. AIBN and peroxides) are utilized in the polymer polyol reaction. Also demonstrated is the benefit of a peroxide blend in decreasing fouling in a carbon steel reactor.

TABLE 5

Preformed Stabilizer Composition

| PFS Component | Example 20 |
|---|---|
| PCA Type | Isopropanol |
| PCA, wt. % (100% fresh) | 60.0% |
| Macromer | Macromer A |
| Macromer, wt. % | 24.0% |
| Monomer, wt. % | 15.9% |
| Styrene/acrylonitrile | 50:50 |
| Initiator A, wt. % | 0.1% |

TABLE 6

Polymer Polyol Formulations:

| Component | Ex. 21 | Ex. 22 | Ex. 23 | Ex. 24 | Ex. 25 | Ex. 26 |
|---|---|---|---|---|---|---|
| Polyol B | 45.55 | 44.54 | 44.59 | 44.59 | 44.58 | 44.57 |
| PFS Example 20 | 6.88 | 6.88 | 6.88 | 6.88 | 6.88 | 6.88 |
| Styrene | 30.84 | 31.46 | 31.46 | 31.46 | 31.46 | 31.46 |
| Acrylonitrile | 16.48 | 16.82 | 16.82 | 16.82 | 16.82 | 16.82 |
| Initiator B | | | 0.25 | 0.25 | 0.25 | 0.25 |
| Initiator C | | | | | 0.02 | |
| Initiator D | | | | | | 0.02 |
| Initiator E | 0.30 | 0.30 | | | | |
| Total Polymer (wt. %) | 49.7 | 50 | 50.9 | 50.7 | 50.9 | 50.9 |
| Reactor Material[1] | SS | CS | SS | CS | CS | CS |
| Polymer Fouling in Reactor (g) | <2 | <2 | <2 | 33 | <2 | <2 |

[1]CS = carbon steel; SS = stainless steel

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A preformed stabilizer comprising the free-radical polymerization product of:
    (a) at least one ethylenically unsaturated macromer;
    (b) at least one ethylenically unsaturated monomer; and
    (c) at least one free-radical initiator;
in the presence of
    (d) a polymer control agent component which comprises:
        (1) from 5 to 95% by weight of fresh polymer control agent; and
        (2) from 5 to 95% by weight of a recovered polymer control agent;
    wherein the recovered polymer control agent comprises from 50 to 1500 ppm, based on the weight of the recovered polymer control agent, of an inhibitor comprising a phenothiazine, 1,4-benzoquinone, 4-methoxyphenol, octodecyl 3-(3,5-di-tert-butyl-4-hydroxyphenyl)propionate, branched $C_{13-15}$ alkyl esters of 3,5-bis(1,1-dimethylethyl)-4-hydroxy-benzenepropanoic acid, α-tocopherol, an amine-containing compound, a quinone containing compound, or a mixture thereof,
    and wherein the %'s by weight of (d)(1) and (d)(2) total 100% by weight of (d);
and, optionally,
    (e) a diluent.

2. The preformed stabilizer of claim 1, wherein (c) said at least one free-radical initiator comprises at least one peroxide initiator comprising an acyl peroxide, an alkyl peroxide, a peroxyketal, a peroxyester, or a mixture thereof.

3. The preformed stabilizer of claim 2, wherein said at least one peroxide initiator comprises 1,1-di(t-butylperoxy)cyclohexane, 1,1-di(t-amylperoxy)-cyclohexane, t-butyl peroxy-2-ethylhexanoate, t-butylperpivalate, t-amyl peroctoate, t-amylperoxypivalate, 2,5-dimethyl-hexane-2,5-di-per-2-ethyl hexoate, t-butyl perneodecanoate, t-butylperbenzoate, 1,1-dimethyl-3-hydroxybutyl peroxy-2-ethylhexanoate, or a mixture thereof.

4. The preformed stabilizer of claim 1, wherein said recovered polymer control agent is essentially free of turbidity.

5. The preformed stabilizer of claim 1, wherein (d) said polymer control agent component comprises at least one of methanol, ethanol, isopropanol, ethyl benzene, dodecyl mercaptan, octadecylmercaptan, toluene, and triethylamine.

6. A process for the preparation of a preformed stabilizer comprising:
    (1) free-radically polymerizing:
        (a) at least one ethylenically unsaturated macromer;
        (b) at least one ethylenically unsaturated monomer; and
        (c) at least one free-radical initiator;
    in the presence of
        (d) a polymer control agent component which comprises:
            (1) from 5 to 95% by weight of fresh polymer control agent; and
            (2) from 5 to 95% by weight of a recovered polymer control agent;
        wherein the recovered polymer control agent comprises from 50 to 1500 ppm, based on the weight of the recovered polymer control agent, of an inhibitor comprising a phenolic containing compound, an amine containing compound, a quinone containing compound, or a mixture thereof,
        and wherein the %'s by weight of (d)(1) and (d)(2) total 100% by weight of (d);
    and, optionally,
        (e) a diluent.

7. The process of claim 6, wherein (c) said at least one free-radical initiator comprises at least one peroxide initiator comprising an acyl peroxide, an alkyl peroxide, a peroxyketal, a peroxyester, or a mixture thereof.

8. The process of claim 7, wherein said at least one peroxide initiator comprises 1,1-di(t-butylperoxy)cyclohexane, 1,1-di(t-amylperoxy)-cyclohexane, t-butyl peroxy-2-ethylhexanoate, t-butylperpivalate, t-amyl peroctoate, t-amylperoxypivalate, 2,5-dimethyl-hexane-2,5-di-per-2-ethyl hexoate, t-butyl perneodecanoate, t-butylperbenzoate, 1,1-dimethyl-3-hydroxybutyl peroxy-2-ethylhexanoate, or a mixture thereof.

9. The process of claim 6, wherein said recovered polymer control agent is essentially free of turbidity.

10. The process of claim 6, wherein (d) said polymer control agent component comprises at least one of methanol, ethanol, isopropanol, ethyl benzene, dodecyl mercaptan, octadecylmercaptan, toluene, and triethylamine.

11. A polymer polyol comprising the free-radical, in-situ polymerization product of:
(A) a base polyol;
(B) the preformed stabilizer of claim 1;
with
(C) at least one ethylenically unsaturated monomer;
in the presence of:
(D) a free-radical polymerization initiator;
and, optionally,
(E) a chain transfer agent;
and, optionally,
(F) a polymer control agent.

12. A process for the preparation of the polymer polyol of claim 11, comprising
(I) free-radically polymerizing:
(A) a base polyol; and
(B) the preformed stabilizer;
with
(C) at least one ethylenically unsaturated monomer;
in the presence of:
(D) a free-radical polymerization initiator;
and, optionally,
(E) a chain transfer agent;
and, optionally,
(F) a polymer control agent.

13. A polyurethane foam comprising the reaction product of
(I) a diisocyanate and/or polyisocyanate component, with
(II) an isocyanate-reactive component comprising the polymer polyol of claim 11, in the presence of
(III) a catalyst,
(IV) a blowing agent,
and/or
(V) a surfactant.

14. A process of preparing a polyurethane foam comprising reacting
(I) a diisocyanate and/or polyisocyanate component, with
(II) an isocyanate-reactive component comprising the polymer polyol of claim 11, in the presence of
(III) a catalyst,
(IV) a blowing agent,
and
(V) a surfactant.

15. The preformed stabilizer of claim 1, wherein the amine containing compound comprises a N-nitrosophenylhydroxylamine containing compound.

16. The preformed stabilizer of claim 1, wherein the inhibitor comprises phenothiazine, 1,4-benzoquinone, 4-methoxyphenol, octadecyl 3-(3,5-di-tert-butyl-4-hydroxyphenyl)propionate, branched $C_{13-15}$ alkyl esters of 3,5-bis(1,1-dimethylethyl)-4-hydroxy-benzenepropanoic acid, aluminum N-nitrosophenylhydroxylamine, α-tocopherol, or a mixture thereof.

17. The preformed stabilizer of claim 1, wherein the inhibitor comprises the amine containing compound, the quinone containing compound, or a mixture thereof.

18. The process of claim 6, wherein the amine containing compound comprises a N-nitrosophenylhydroxylamine containing compound.

19. The process of claim 6, wherein the inhibitor comprises phenothiazine, 1,4-benzoquinone, 4-methoxyphenol, octadecyl 3-(3,5-di-tert-butyl-4-hydroxyphenyl)propionate, branched $C_{13-15}$ alkyl esters of 3,5-bis(1,1-dimethylethyl)-4-hydroxy-benzenepropanoic acid, aluminum N-nitrosophenylhydroxylamine, α-tocopherol, or a mixture thereof.

20. The process of claim 6, wherein the inhibitor comprises the amine containing compound, the quinone containing compound, or a mixture thereof.

* * * * *